INVENTOR
JOHN T. REDMON

BY Denton and Terry

ATTORNEYS

United States Patent Office 3,525,639
Patented Aug. 25, 1970

3,525,639
WATER ACTIVATABLE STORAGE BATTERY
John T. Redmon, Detroit, Mich., assignor to Globe-Union Inc., Milwaukee, Wis., a corporation of Delaware
Filed June 6, 1969, Ser. No. 831,075
Int. Cl. H01m 35/00, 21/00
U.S. Cl. 136—6                    5 Claims

ABSTRACT OF THE DISCLOSURE

A water activatable storage battery comprising an outer casing, at least one cell having electrode plates positioned within the casing, a space above the plates, and a container storing liquid electrolyte within the space. The container is made of water-insoluble flexible material and has at least one finger-like extension that extends downwardly along the side of the plates. Each extension is sealed with a water-soluble closure means, which is positioned a predetermined distance above the bottom of the cell. The cell is activated when water introduced into the cell reaches the level of the closure means.

---

This invention relates to a water-activated dry charged storage battery and more particularly to a battery having means for retaining an electrolyte within the battery casing and for subsequently releasing the electrolyte upon the addition of a predetermined amount of water to the battery.

Heretofore many attempts have been made to manufacture dry charged storage batteries which are safe to store and to handle and which can be readily activated for use by rupturing or discharging a reservoir containing electrolyte within the casing of the battery. For example, U.S. Pat. 2,832,814 shows a storage battery having an electrolyte reservoir positioned above each of the cells for holding a desired amount of acid or electrolyte to be introduced into each cell of the battery. The reservoir can be emptied into its associated cell by removing a closure device provided in the lower portion of the reservoir. The closure device includes a stem-like element which may be formed into a weakened flangible thin wall of the reservoir and which is removed via the filling neck for the cell. One of the disadvantages of this battery construction is that the stem-like element may be accidentally depressed during handling of the battery and thus inadvertently cause emptying of the reservoir and premature actuation of the cells. Also there is a likelihood of the electrolyte splashing outside the battery casing when the stem is removed by a person attempting to actuate the battery.

Another similar battery construction is shown by U.S. Pat. 2,773,927 wherein an acid container with a neck and stopper is provided within the battery casing above the plates in each cell chamber of the battery. This container has a weakened section directly below and concentric with the neck and stopper which is adapted to be punctured by inserting a punch or other solid shaft-like member through the neck. One of the disadvantages of this construction is that the person using a punch to rupture the wall of the container may receive harmful burns caused by splashing of the acid during insertion of the punch. Moreover, if the container is punctured before water is added to the battery the heat generated during addition of the water to acid in the battery may cause some of the acid to discharge violently from the battery.

A more recent attempt to provide a water-activated dry charged battery is illustrated by U.S. Pat. 3,304,202 wherein a sealed container of a charge of an electrolyte concentrate is confined within the space between the plates of each cell and the top of the battery casing. The container is made of a material which is insoluble in water and which is soluble in an organic solvent. A capsule containing an organic solvent and beig made of a material which is water soluble is provided for causing rupture of the container. The capsule may be placed in the battery on top of the electrolyte container so that it will cause activation of the battery upon the addition of water into the battery and onto the capsule or the battery may be filled with water and the capsule added subsequently to free the solvent and thereby cause rupturing of the electrolyte container. This arrangement is not only cumbersome and costly but also requires the close attention of the person activating the battery, or the use of a slowly dissolvable electrolyte to avoid generating excessive heat by rapid mixing of the water with the acid concentrate. Therefore it will be appreciated that many problems and hazards are still attendant to the use and the construction of the known batteries.

Advantageously in accordance with the present invention a water-activatable storage battery is provided which overcomes these problems and which can be readily activated by relatively untrained persons without the hazard of causing acid burns or generation of excessive heat during activation of the battery.

Thus this invention contemplates a water-activatable storage battery which comprises an outer battery casing, at least one cell having electrode plates positioned within the casing, a space within the casing above the plates, and a container storing liquid electrolyte within the space, the container being made of a flexible water-insoluble, electrolyte-resistant material and having at least one finger-like extension that extends downwardly along the plates within the cell, the finger-like extension being sealed by a water-soluble closure means positioned a predetermined distance above the bottom of the battery casing whereby electrolyte within the container will not be released until the water added to the cell has reached the level of the closure means.

In one particularly effective embodiment of this invention the container positioned in the battery casing is in the form a flexible bag of plastic material, e.g., polyethylene, having one or more finger-like tubular extensions with an open end or extremity. The open end or extremity of the extension is doubled over an tied with a tape or string made of water-soluble material (e.g., polyvinyl alcohol) so that upon being contacted with water the string will dissolve and allow the liquid electrolyte within the bag to flow downwardly and out through the open extremity into the water within the battery casing.

It will be understood that in accordance with this invention the length of the finger-like extension and the position of the water-soluble closure means are so selected that sufficient amount of water must be added to the battery cell to reach a predetermined level before activation will occur; thereby avoiding the possibility of any violent generation of heat during mixing of the concentrated electrolyte to the water.

Moreover, it will be appreciated that with this construction a person only needs to add water to each of the battery cells to cause proper activation and that no additional steps are necessary. Also it will be understood that the heat generated upon release of the electrolyte will be sufficient to alert the person filling the battery with water to the fact that the electrolyte is being admixed with the water. Therefore, relatively untrained personnel can safely and readily activate the battery.

The electrolyte retained within the flexible container may be sulfuric acid in concentrated liquid form or a thickened flowable jell. Moreover it will be appreciated that the use of the flexible electrolyte container in accordance with this invention is not restricted to lead-acid battery cells. Batteries of the alkaline-type such as nickel-cadmium, nickel-iron, silver-zinc, and the like may employ a concentrated liquid alkaline electrolyte such as potassium hydroxide.

The water-insoluble, electrolyte-resistant, materials that may be used to form the flexible container for the battery electrolyte include films of polyethylene, polypropylene, vinyl resins, e.g., polyvinyl chloride and oriented polystyrene, and rubbers, e.g., rubber hydrochloride and nitrile rubbers, and the like. Moreover, it will be appreciated that the materials used preferably are those which can be fabricated into the container by conventional extrusion techniques.

Among the water-soluble materials for making the tape, string, ribbon, strip or like tying device used to form the water-soluble closure means are polyvinyl alcohol, polymers of methyl cellulose, polyethylene oxide and other film-forming water-soluble resins.

The advantages of the present invention will become more apparent upon reference to the following detailed description of a preferred embodiment and the accompanying drawings in which.

Figure 1:
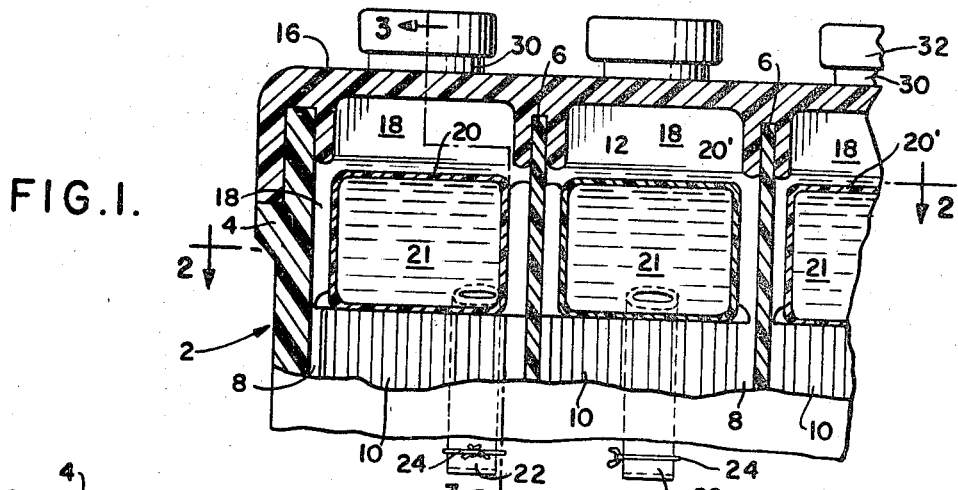
FIG. 1 is a side elevational view of a storage battery with part of the casing broken away to show the arrangement of the electrolyte containers within the cells of the battery.

In FIG. 1 reference numeral 2 generally designates a battery comprising a casing 4 having a plurality of cell or partition walls 6 molded integrally with the casing to form cell chambers 8. An electrode assembly 10 is mounted in each chamber. The electrode assemblies are of the conventional design used in acid-lead batteries and include positive and negative plates alternately arranged with suitable separators and with straps 12 of opposite polarity cast to the respective positive and negative plates of each assembly. The electrode assemblies in the end cell chambers are provided with terminal posts, one of which is shown and designated by reference numeral 14. Each post extends downwardly through the battery cover 16 and is connected to one of the straps, thereby providing an external electrical connection for the circuit in which the battery is to be employed. A space 18 is provided between the cover 16, the top of the plates and the walls 6 in each cell chamber. Located within space 18 in each cell is an electrolyte container 20 (and 20') in the form of a flexible polyethylene bag. An electrolyte charge 21 of concentrated sulfuric acid is retained within this container.

Figure 2:
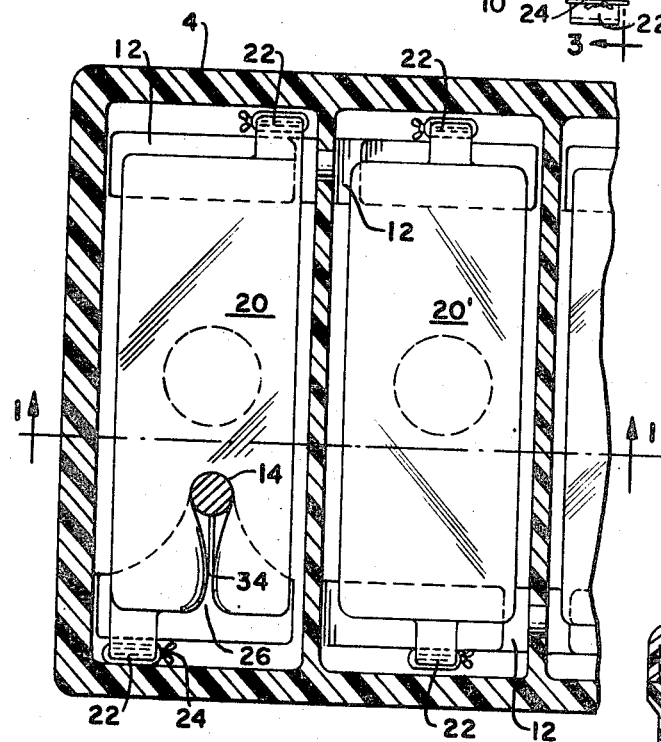
FIG. 2 is a plan view, partly in section, of the battery and electrolyte containers taken along line 2—2 of FIG. 1.

As shown in FIG. 2, the bag is provided with two finger-like tubular extensions 22, which extend downwardly from the ends thereof along the sides of the plates of each electrode assembly 10. Each of these finger-like extensions has an open end or extremity 23. The open end of the extension is folded over and tied with a water-soluble string 24 formed of polyvinyl alcohol to provide a water-soluble closure means for each extension. The electrolyte containers 20 located in the end cell chamber are also provided with a groove 26 to allow the containers to fit around the terminal post which extends through each of the chambers. The containers 20' in the intermediate cell chambers may also be provided with a groove or (as shown) may only be provided with the two finger-like extensions. Moreover, it will be understood that the extensions are preferably provided on the bottom portion of each bag to facilitate gravity flow of electrolyte from the bag when the string 24 dissolves and the end of the extension partially or completely unfolds. Also the extension, as shown on the embodiments of the bag employed in the end and intermediate cell chambers, may extend from alternate sides of each end of the bag or from the center of the ends.

Figure 3:
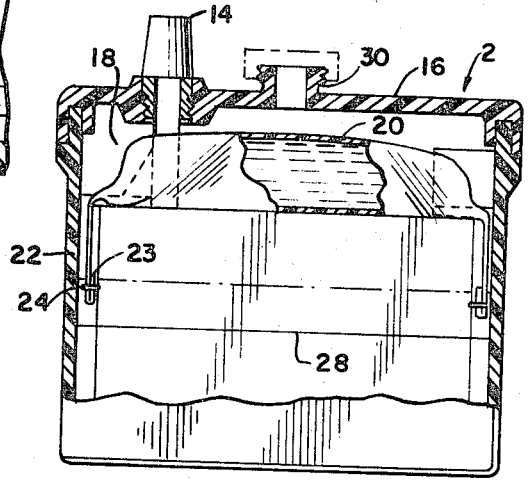
FIG. 3 is a side elevational view of an end of the battery showing the relative position of an electrolyte container on top of the plates taken along line 3—3 of FIG. 1.

As illustrated in FIGS. 2 and 3 each electrolyte container extends substantially across the entire length of the space above the plates in the cell chamber so that the finger-like extensions will extend downwardly a limited extent between the casing of the battery and the plates of the electrode or cell assembly.

The water-soluble closure means at the lower extremity of the extensions in each cell are also positioned at a predetermined distance above the bottom of the cell chamber. With this arrangement the acid electrolyte will not be released from the container until the water level reaches the closure means and causes the string 24 to dissolve.

The flexible bag 20 (or 20') may be made so that when the bag is filled, it is spaced from the cell walls in order that water introduced through the fill neck or opening 30 will flow downwardly along the longitudinal sides of the bag into the lower position of the cell chamber. Also, the flexible bag used to form the container may be extruded to such dimensions that the bag, when filled with electrolyte, will initially contact the sides of the cell walls. With this embodiment channels may be provided on each side of the container by ribs or grooves formed in the cell walls to allow water to flow downwardly over the longitudinal sides of the container. In another embodiment, the bag may contact the sides of the cell walls and the water will then flow over the ends of the bag. Groove 26 in bag 20 provides a flow directing channel 34 which will direct the water away from the closure means. Preferably the container is shaped as bag 20, to insure that the water will flow either over the longitudinal sides or along the channel 34 to fill the cell chamber before contacting the water-soluble string 24.

It will be understood that the required procedure for activating each cell of the battery of this invention only involves removing the vent cap 32 from the fill opening 30 and slowly pouring water through the opening over the electrolyte container and into the bottom of the cell until the water level has reached the desired level over the plates of the cell assembly. Once the water reaches or exceeds the level of the tied-off portion of the finger-like extension it will dissolve the closure means and release the acid into the water. Simultaneously, the bag will collapse and remain on the top of the electrode assembly. The bag material, which is inert to the electrolyte, will not interfere with the operation of the battery.

It will be appreciated that the water-soluble string may be heat sealed, adhesively bonded, or otherwise secured together by means other than a tied knot. Also it will be further appreciated that suitable closure means for closing the open extremity of the extension may be also provided by twisting the lower extremity of the finger-like extension together along its longitudinal axis and then by holding the extension in the twisted configuration with the water-soluble string, by simply wrapping the string tightly around the lower portion of the extension, or by other suitable means which are disintegrable upon being immersed within the water added to the battery.

Also it will be appreciated that the container may be charged with appropriate concentrated liquid electrolyte by closing off one of the extensions with the water-soluble closure means, filling through another extension and then by closing off the other extension.

What is claimed is:

1. A water-activatable storage battery which comprises an outer battery casing, at least one cell having electrode plates positioned within the casing, a space within the casing above the plates, and a container storing liquid electrolyte within said space, said container being made of a flexble water-insoluble, electrolyte resistant material and having at least one finger-like extension that extends downwardly along the plates within the cell, and a water soluble closure means sealing said finger-like extension, said closure means being positioned a predetermined distance above the bottom of the battery casing whereby the electrolyte within the container will not be released until water added to the cell has reached the level of the closure means.

2. The battery of claim 1 in which said container is a flexible plastic bag having a tubular finger-like extension with an open end and said closure means comprises a water-soluble string wrapped around said extension sealing off the open end.

3. The battery of claim 2 in which the open end of said extension is doubled over and said string is tied around the doubled over portion of said extension.

4. The battery of claim 2 in which said string is made of a material selected from the group consisting of polyvinyl alcohol, polymers of methyl cellulose and polyethylene oxide.

5. The battery of claim 1 in which said container is made of a material selected from the group consisting of polyethylene, polypropylene, vinyl resins, and rubber.

References Cited

UNITED STATES PATENTS

| | | | |
|---|---|---|---|
| 2,773,927 | 12/1956 | Yeoman | 136—166 |
| 3,304,202 | 2/1967 | Sam | 136—6 |
| 2,832,814 | 4/1958 | Shannon | 136—162 |

WINSTON A. DOUGLAS, Primary Examiner

A. SKAPARS, Assistant Examiner

U.S. Cl. X.R.

136—90, 114, 166